March 3, 1936. J. W. B. PEARCE ET AL 2,032,496
UNIVERSAL JOINT
Filed April 3, 1930
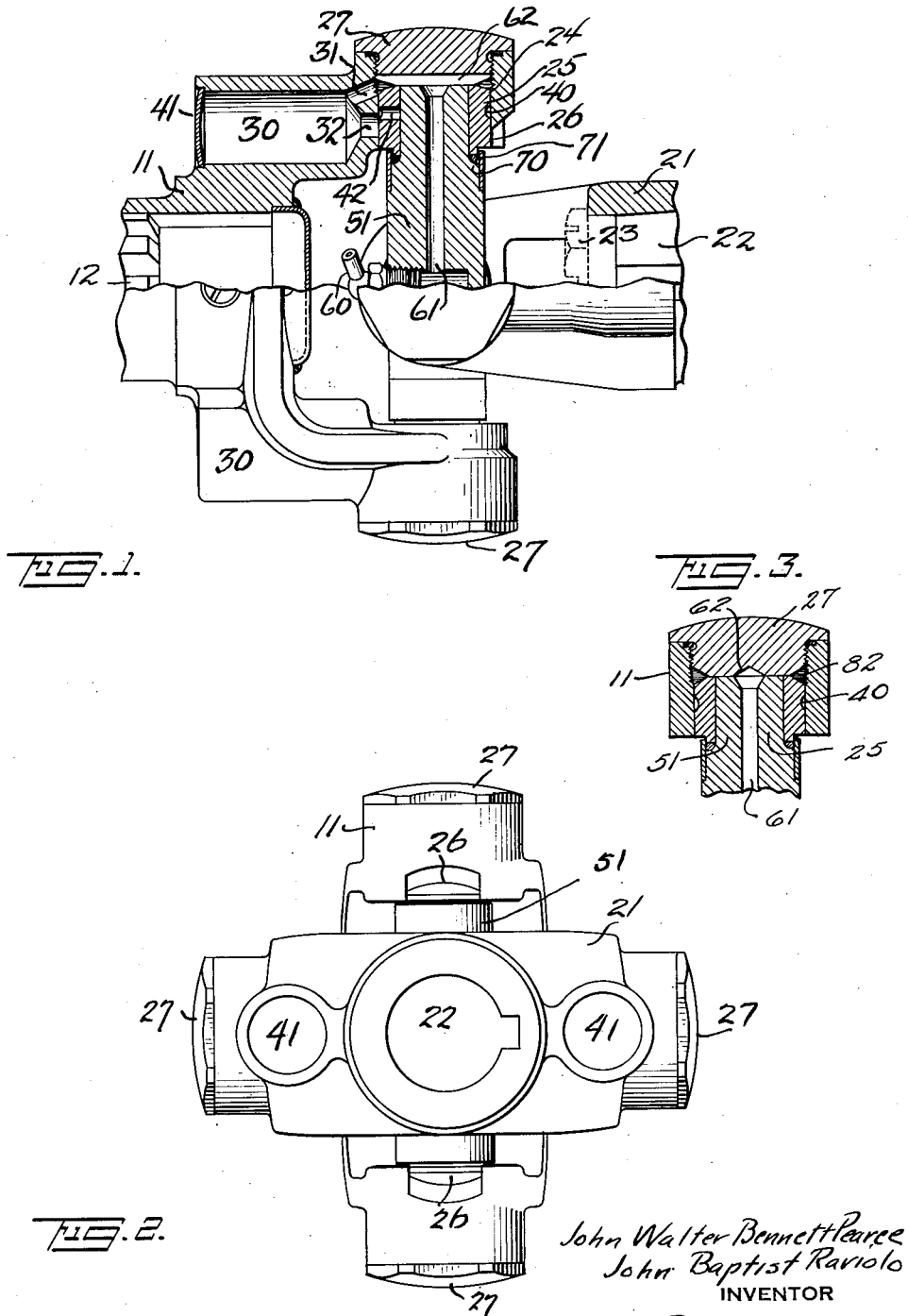
John Walter Bennett Pearce
John Baptist Raviolo
INVENTOR
BY
ATTORNEY Patented Mar. 3, 1936

2,032,496

UNITED STATES PATENT OFFICE 2,032,496

UNIVERSAL JOINT

John Walter Bennett Pearce and John Baptist Raviolo, Toledo, Ohio; said Raviolo assignor to Spicer Manufacturing Corporation, Toledo, Ohio, a corporation of Virginia Application April 3, 1930, Serial No. 441,239

8 Claims. (Cl. 64—17)

Our invention relates to universal joints of the type designed for wide angular movement, especially to that type of joint in which the two yokes are connected together by a four trunnioned journal, and has for its object to produce a joint in which there is ample lubricant containing space without interference to joint movement.

A further object is to produce a yoke that has a lubricant containing space which feeds lubricant to the bushings at a point outside the leak point. This feature is of prime importance because wtih that construction centrifugal force will not have any tendency to force the lubricant between the packing.

The foregoing and other features of our invention will now be described in connection with the accompanying drawing forming part of this application in which we have represented our universal joint in its preferred form after which we shall point out in the claims those features which we believe to be new and/or our invention.

In the drawing:

Figure 1 is a side view, in part section of our joint.

Figure 2 is an end view thereof.

Figure 3 is a part section of the trunnion bearing at right angles to that shown in Figure 1.

In our invention we provide two yokes 11 and 21 journaled together for universal movement to a four trunnion journal 51.

The yokes are identical except that yoke 11 is illustrated as a splined yoke, the spline indicated at 12, while yoke 21 is illustrated as a stub yoke which as shown is secured to a shaft 22 by means 23.

Each yoke is bifurcated and is provided with seats 24 in which bushings 25 are adapted to snugly fit. The seats 24 are cut away as shown at 26 so that there is clearance for the assembly of the joint. A screw threaded plug 27 closes the outer end of bearing seat 24. The bushings 25 and the screw threaded end of the plug 27 are chamfered to provide an annular lubricating passage 82 around the end of the bearing. A cross passage 62 is provided in the plug 27 to connect the passage 61 with pasage 82. In the two arms of the bifurcated yoke we provide lubricant containing chambers 30 provided with passage 31 leading to the annular passage 82 and cross passage 62 beyond the bushing, and with passage 32 leading to the bearing seat at a point substantially mid-way the length of the bushing.

The bushings 25 are provided with a groove 40 and a passage 42 leading to the bearing surface. This groove 40 registers with the passage 32 so that lubricant may be supplied from the lubricant containing chamber 30 to the bearings of the joint. The outer end of lubricant containing chamber may be closed in any well known means such as a pressed fitted plug or disk 41.

In assembling the joint the journal 31 with its four trunnions is consecutively stepped into the bearing seats, the bushings are then press fitted into place between the bearing seats and the trunnions and screw plugs put in place and takes the side thrust; the joint is now ready for universal movement.

Lubricant is put in the chambers through the plug 60 which is connected to a passage 61 leading from the center of the journal 31 outwardly through the four trunnions and into small spaces 62 and 82 beyond the ends of the trunnions and bushings and through the passage 31 into the lubricant containing chambers 30.

The leak point at 70 is packed with packing 71 and it should be noted that the lubricant is supplied beyond this point so that the action of centrifugal force does not throw or force the lubricant out of the joint.

To lubricate the bearings the lubricant flows through passage 32 to the groove 40, through the passage 42 to the bearing and through centrifugal force it is lead to the outside of the joint and away from the leak point which is closed by packing 71.

In the claims we have used the term "centrifugal leak point" and by this we mean that moving joint which is found in universal joints where the lubricant may be forced out due to centrifugal force and be thrown off and lost while the joint is revolving.

We wish it distinctly understood that our universal joint herein described is in the form in which we desire to construct it but that changes or variations may be used as may be convenient or desirable without departing from the salient features of our invention and we therefore intend the following claims to cover such modifications as naturally fall within the lines of invention.

We claim:

1. In a universal joint in combination two yokes provided with lubricant chambers and arranged to receive a four bearing trunnion, a solid four bearing trunnion; bushings interposed between the trunnion and the yoke, said lubricant chambers positioned within the arms of the yoke and so connected with the bushings at points outside of the centrifugal leak point and substantially all the lubricant located within said chambers; screw threaded plugs adapted to screw into the yokes to locate the bushings in the radial plane, to form a lateral thrust bearing and to provide a closure to prevent the leak of lubricant from the chambers in the yokes; passage through the plug to permit free flow of lubricant from the chamber to the bushing.

2. In a universal joint where two yokes are journaled for universal motion to a four trunnion journal, lubricant containing chambers located within the arms of the yokes and positioned between the outer ends of the trunnions and the centrifugal leak points of the joint so that lubricant will continue to feed under the action of centrifugal force to the trunnions until substantially used up without loss through said points.

3. The combination defined in claim 2 including means for filling the lubricant containing chambers through the center of the journal.

4. The combination defined in claim 2 including bushings in said yoke arms that receive said trunnions and ferrules mounted on said trunnions and overlapping the inner ends of said bushings at said leak points.

5. In a universal joint the combination of a plurality of relatively movable members including a member having a pair of substantially alined openings therein and a second member having a pair of trunnions extending outwardly into said openings, said second member including a shoulder surrounding each trunnion adjacent the base thereof, a ferrule secured to said member adjacent each shoulder and forming an outwardly opening channel, means surrounding each trunnion within the opening in which it is disposed and forming a bearing for the trunnion and centering the same therein, said last named means being out of contact with the adjacent edge of said ferrule and having a circumferential part that extends within said outwardly opening channel so that the ferrule laps the leak point of each trunnion, a packing in said outwardly opening channel between said means and said shoulder, and abutments to maintain said part in said channel and to locate said trunnions with respect to the center of the joint.

6. In a universal joint the combination of a plurality of relatively movable members including a member having a pair of substantially alined openings therein and a second member having a pair of trunnions extending outwardly into said openings, said second member including a shoulder surrounding each trunnion adjacent the base thereof, a ferrule secured to said member adjacent each shoulder and forming an outwardly opening channel, means surrounding each trunnion within the opening in which it is disposed and forming a bearing for the trunnion and centering the same therein, said last named means being out of contact with the adjacent edge of said ferrule and having a circumferential part that extends within said outwardly opening channel so that the ferrule laps the leak point of each trunnion, a packing in said outwardly opening channel between said means and said shoulder, and abutments secured to said member having the openings outwardly of said trunnions to maintain said parts in said channels and to locate said trunnions with respect to the center of the joint.

7. In a universal joint, a rotatable member, a pair of aligned apertured elements carried thereby, a second member having a pair of trunnions extending outwardly into said apertured elements, said second member including a shoulder surrounding each trunnion adjacent the base thereof, an annular part carried by said second member at the base of each trunnion and forming an outwardly opening channel at said base, said apertured elements forming bearing elements for centering said trunnions, each said apertured element being out of contact with the adjacent edge of the adjacent annular part and having a tubular part that extends within said outwardly opening channel so that the annular part overlaps the leak point where the trunnion enters said tubular part, a packing for each trunnion between its base and the surrounding tubular part, and fixed abutments on said first mentioned member for positively predetermining the position of said trunnions with respect to the axis of rotation of said first mentioned member.

8. In a universal joint, the combination of a plurality of relatively movable members including a member having a pair of substantially aligned openings therein and a second member having a pair of trunnions extending outwardly into said openings, said second member including a shoulder surrounding each trunnion adjacent the base thereof, an annular part carried by said second member and forming an outwardly opening channel at said base, means surrounding each trunnion within the opening in which it is disposed and forming a bearing for said trunnion and centering said trunnion, said last named means being out of contact with the adjacent edge of said annular part and having a tubular part that extends within said outwardly opening channel so that the annular part overlaps the leak point where said trunnion enters said tubular part, a packing for each trunnion between said tubular part and said base, and fixed abutments on said first mentioned member for positively predetermining the position of said trunnions with respect to the axis of rotation of said first mentioned member.

JOHN WALTER BENNETT PEARCE.
JOHN BAPTIST RAVIOLO.